US010108714B2

United States Patent
Cavalin et al.

(10) Patent No.: US 10,108,714 B2
(45) Date of Patent: Oct. 23, 2018

(54) SEGMENTING SOCIAL MEDIA USERS BY MEANS OF LIFE EVENT DETECTION AND ENTITY MATCHING

(71) Applicant: INTERNATIONAL BUSINESS MACHINES CORPORATION, Armonk, NY (US)

(72) Inventors: Paulo R. Cavalin, Rio de Janeiro (BR); Maira Gatti De Bayser, Rio de Janerio (BR); Joao P. Forny De Melo, Rio de Janeiro (BR); Claudio S. Pinhanez, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/977,856

(22) Filed: Dec. 22, 2015

(65) Prior Publication Data
US 2017/0177722 A1 Jun. 22, 2017

(51) Int. Cl.
*G06F 17/30* (2006.01)
*H04L 29/08* (2006.01)
*H04L 12/58* (2006.01)
*G06Q 50/00* (2012.01)
*G06N 99/00* (2010.01)

(52) U.S. Cl.
CPC ..... *G06F 17/30864* (2013.01); *G06N 99/005* (2013.01); *G06Q 50/01* (2013.01); *H04L 51/063* (2013.01); *H04L 51/14* (2013.01); *H04L 51/32* (2013.01); *H04L 67/1044* (2013.01); *H04L 67/22* (2013.01); *H04L 67/306* (2013.01)

(58) Field of Classification Search
CPC . G06F 17/30864; H04L 67/22; H04L 67/306; H04L 67/1044; H04L 51/32; G06Q 50/01; G06N 99/005
See application file for complete search history.

(56) References Cited

U.S. PATENT DOCUMENTS

| 2002/0055906 | A1* | 5/2002 | Katz | G06Q 20/10 705/39 |
| 2007/0121843 | A1 | 5/2007 | Atazky et al. | |
| 2008/0005106 | A1* | 1/2008 | Schumacher | G06F 17/30489 |
| 2008/0243531 | A1* | 10/2008 | Hyder | G06Q 30/02 705/1.1 |
| 2010/0023341 | A1* | 1/2010 | Ledbetter | G06Q 10/10 705/1.1 |
| 2012/0016817 | A1* | 1/2012 | Smith | G06N 99/005 706/12 |

(Continued)

OTHER PUBLICATIONS

Di Eugenio et al., "Detecting Life Events in Feeds from Twitter." ICSC. 2013, 4 pages.

(Continued)

*Primary Examiner* — Scott A. Waldron
*Assistant Examiner* — Hubert Cheung
(74) *Attorney, Agent, or Firm* — Scully, Scott, Murphy & Presser, P.C.; Louis Percello, Esq.

(57) ABSTRACT

The present disclosure relates generally to the field of segmenting social media users (such as users of a social media network) by means of life event detection (such as based upon social media messages and/or postings) and entity matching. In various embodiments, systems, methods and computer program products are provided.

20 Claims, 6 Drawing Sheets

(56) References Cited

U.S. PATENT DOCUMENTS

| | | | | |
|---|---|---|---|---|
| 2012/0239497 | A1* | 9/2012 | Nuzzi | G06Q 30/02 705/14.53 |
| 2013/0159132 | A1* | 6/2013 | Adams | G06Q 50/01 705/26.7 |
| 2013/0204882 | A1* | 8/2013 | Blaschak | G06F 17/3053 707/751 |
| 2014/0025491 | A1* | 1/2014 | Nagarajan | G06Q 30/0207 705/14.53 |
| 2015/0372963 | A1* | 12/2015 | Root | H04L 51/32 709/206 |
| 2016/0035039 | A1* | 2/2016 | Singh | G06Q 40/08 705/4 |
| 2016/0117651 | A1* | 4/2016 | Davis | G06Q 20/3255 705/40 |
| 2016/0132488 | A1* | 5/2016 | Clark | G06F 17/2785 704/9 |
| 2016/0132591 | A1* | 5/2016 | Clark | G06F 17/30684 707/723 |
| 2016/0352860 | A1* | 12/2016 | Deb | G06Q 50/01 |
| 2016/0364992 | A1* | 12/2016 | Krishnamurthy | G09B 5/06 |
| 2016/0378760 | A1* | 12/2016 | Braz | G06O 10/107 707/728 |
| 2017/0019496 | A1* | 1/2017 | Orbach | H04L 67/306 |

OTHER PUBLICATIONS

Ilina et al. "Social event detection on twitter." Web Engineering. Springer Berlin Heidelberg, 2012. 169-176.

Wang et al., "To stay or leave?: the relationship of emotional and informational support to commitment in online health support groups." Proceedings of the ACM 2012 conference on Computer Supported Cooperative Work. ACM, 2012.

Campbell et al., "Collecting relevance feedback on titles and photographs in weblog posts." Proceedings of the 2012 ACM international conference on Intelligent User Interfaces. ACM, 2012.

Atefeh, F. et al., "A Survey of Techniques for Event Detection in Twitter", Computational Intelligence, (2013), vol. 0, No. 0, 33 pages.

Bilenko, M. et al., "Adaptive Name Matching in Information Integration", IEEE Intelligent Systems, (Sep. 2003), pp. 2-9.

Cohen, W. W. et al., "A Comparison of String Distance Metrics for Name-Matching Tasks", (2003), 6 pages.

De Choudhury, M. et al., "Major Life Changes and Behavioral Markers in Social Media: Case of Childbirth", 2013 Conference on Computer Supported Cooperative Work, New York, NY, (2013), pp. 1431-1442.

Ehrlich, K. et al., "Microblogging Inside and Outside the Workplace", International Conference on Web and Social Media, (2010), pp. 42-49.

Felt, A. P. et al., "Phishing on Mobile Devices", IEEE Web 2.0 Security and Privacy Workshop, (2011), 10 pages.

Kwak, H. et al., "What is Twitter, a Social Network or a News Media?", 19th International Conference on World Wide Web, New York, NY, (2010), 10 pages.

Lin, J. et al., "Data-Intensive Text Processing with MapReduce", Claypool Publishers, (2010), 175 pages.

Liu, F. et al., "A Broad-Coverage Normalization System for Social Media Language", 50th Annual Meeting of the Association for Computational Linguistics: Long Papers—vol. 1, Stroudsburg, PA, (2012), ACL '12, pp. 1035-1044.

Peled, O. et al., "Entity Matching in Online Social Networks", Social Computing 2013 International Conference, (Sep. 2013), pp. 339-344.

Raad, E et al., "User Profile Matching in Social Networks", Network-Based Information Systems (NBiS), (Sep. 2010), pp. 297-304.

Vosecky, J. et al., "User Identification Across Multiple Social Networks", First International Conference on Networked Digital Technologies, (Jul. 2009), pp. 360-365.

Winkler, W.E., "String Comparator Metrics and Enhanced Decision Rules in the Fellegi-Sunter Model of Record Linkage", Section on Survey Research Methods, American Statistical Assocation, (1990), pp. 354-359.

Weiss, S.M. et al., "Fundamentals of Predictive Text Mining", Springer London, (2010), 232 pages.

Sokolova, M. et al., "A systematic analysis of performance measures for classification tasks", Information Processing and Management, (2009), vol. 25, pp. 427-437.

Levenshtein, V.I., "Binary Codes Capable of Correcting Deletions, Insertions, and Reversals", Soviet Physics Doklady, (1966), pp. 707-710.

Twitter. "Using the Twitter Search API", (2015), Accessed: Dec. 16, 2015, 6 pages.

Hernandez, M. et al., "Constructing Consumer Profiles from Social Media Data", 2013 IEEE International Conference on Big Data, (2013), pp. 710-716.

The Source for Social Data—Grip, https://web.archive.org/web/20140517102639/http://grip.com/, printed on Mar. 28, 2016, 15 pages.

IBM—InfoSphere BigInsights Standard Edition, https://web.archive.org/web/20140503150259/http://www-03/ibm.com/software/products/en/infosphere-biginsights-standard-ed, printed on Mar. 28, 2016, 2 pages.

FOAF-O-MATIC 2.0, https://web/archive.org/web/20140219173648/http://www/foaf-o-matic.org/, printed on Mar. 23, 2016, 1 page.

Okkam—Thinking identifiers!, https://web/archive.org/web/20141219133617/http://www.okkam.org/, printed on Mar. 28, 2016, 2 pages.

\* cited by examiner

SEGMENTING SOCIAL MEDIA USERS BY MEANS OF LIFE EVENT DETECTION AND ENTITY MATCHING

BACKGROUND

The present disclosure relates generally to the field of segmenting social media users (such as users of a social media network) by means of life event detection (such as based upon social media messages and/or postings) and entity matching. In various embodiments, systems, methods and computer program products are provided.

Social Media Networks ("SMN"), such as TWITTER and FACEBOOK, engage thousands of people that post, on a daily basis, a huge amount of content represented by texts, images, videos, etc. (see Ehrlich, K., and Shami, N. S. Microblogging inside and outside the workplace, in *ICWSM* (2010); and Kwak, H., Lee, C., Park, H., and Moon, S. What is twitter, a social network or a news media? in *Proceedings of the 19th international conference on World wide web* (New York, N.Y., USA, 2010), WWW '10, ACM, pp. 591-600). Often the content can be intimately related to the person that publishes it, in such a way that the content can expose behavioral traits and/or events that are happening in the individual's life. As a consequence, the proper exploration of this type of content not only can be a way to better understand the users on SMNs, but also can leverage many applications that require adequate user profiling (for instance, credit risk analysis, marketing campaigns, and personalized product and/or service offers).

One way to find potential customers for services and/or products is by detecting life events from public user activities on SMNs (e.g., in special microbloggings). Generally, a life event can be defined as something important that happened, is happening, or will be happening, in a particular individual's life, such as getting married, getting divorced, school graduation, having a baby, someone dying, buying a house, travel and a birthday (or any other person-specific and/or seasonal event or moment). That is, if a life event is properly detected, a product and/or service can be offered to someone even before he or she looks for it (anticipating his or her needs). For instance, if a person posts on the SMN that her marriage will be happening in a few days (or weeks or months), a loan or an insurance (for the honeymoon trip for example) can be offered to her in advance. Furthermore, as stated in Eugenio, B. D., Green, N., and Subba, R. Detecting life events in feeds from twitter. 2012 *IEEE Sixth International Conference on Semantic Computing* 0 (2013), 274-277, marketers know that people mostly shop based on habits, but that among the most likely times to break those habits is when a major life event happens.

For this reason, embodiments described herein focus on mechanisms that can detect life events from textual posts on SMNs, and that can match the corresponding users with an existing database (e.g., entity matching with current clients), using basic information such as, for example, the name and the location available on the SMN. Entity matching is important to understand whether a given user of a SMN is already a customer or not, and adapt the way the person can be approached.

Both life event detection and entity matching are complex tasks which are subject of various research in fields such as artificial intelligence, machine learning (see Eugenio, B. D., Green, N., and Subba, R. Detecting life events in feeds from twitter, 2012 *IEEE Sixth International Conference on Semantic Computing* 0 (2013), 274-277), natural language processing and large scale analysis of unstructured data, popularly known as Big Data (Lin, J., and Dyer, C. *Data-Intensive Text Processing with MapReduce;* Claypool Publishers, 2010). Performing natural language processing on microbloggings' posts presents several challenges, such as dealing with the short and asynchronous nature of the messages (making it difficult to extract contextual information), and dealing with a very unnormalized vocabulary (due to the frequent use of slangs, acronyms, abbreviations, and informal language often with misspelling errors) (see Atefeh, F., and Khreich, W. A survey of techniques for event detection in twitter, *Computational Intelligence* (2013), n/a{n/a; Felt, A. P., and Wagner, D. Phishing on mobile devices, in In *W2SP* (2011); and Liu, F., Weng, F., and Jiang, X. A broad-coverage normalization system for social media language, in *Proceedings of the 50th Annual Meeting of the Association for Computational Linguistics: Long Papers— Volume* 1 (Stroudsburg, Pa., USA, 2012), ACL '12, Association for Computational Linguistics, pp. 1035-1044). Nonetheless, one study that supports the possibility of detecting life events from textual posts has been presented in De Choudhury, M., Counts, S., and Horvitz, E. Major life changes and behavioral markers in social media: Case of childbirth, In *Proceedings of the* 2013 *Conference on Computer Supported Cooperative Work* (New York, N.Y., USA, 2013), CSCW '13, ACM, pp. 1431-1442. In that work, the authors conducted a study on the behavior of mothers during pregnancy, and they observed that these mothers can be distinguished by linguistic changes captured by shifts in a relatively small number of words in their social media posts.

In light of this, described and evaluated herein are various solutions to tackle the life event detection problem (along with subsequent entity matching). For the first task, described is a hybrid system combining rules and machine learning ("ML"). In contrast to the system specifically focused on life event detection presented in Egenio, B. D., Green, N., and Subba, R. Detecting life events in feeds from twitter. 2012 *IEEE Sixth International Conference on Semantic Computing* 0 (2013), 274-277, which uses only ML, various embodiments disclosed herein allow for dealing with the life event classes independently.

In one example, the rule-based phase acts as a mechanism to filter most posts that do not contain life events (since all those posts not matching the desirable rules are eliminated). Then, binary classifiers (e.g., one for each type of life event) are applied to validate the possible life events. For entity matching, a combination of string distance functions is used in this example to compare the names and locations of the users.

Since various embodiments described herein comprise a hybrid solution including an ML-based classifier that is integrated with an entity matching solution, additional discussion of background and related work is presented separated for both as follows.

More particularly, with respect first to life event detection (as already mentioned) a life event can be defined as something important regarding the user's life in one or more SMNs. In this regard, it is important to differentiate such a life event from some related work which uses the event detection expression to refer to the problem of detecting an unexpected event exposed by several users in one or more SMNs (like a rumor, a trend, or emergent topic). In contrast, in the case of various embodiments of the present disclosure, detection means are provided to classify a short post (like TWITTER'S or FACEBOOK'S status messages) in one of the life event categories (which could be considered, for instance, topics). Therefore, as related work, any approach of topic classification of short messages could be considered (for example, Eugenio, B. D., Green, N., and Subba, R. Detecting life events in feeds from twitter. 2012 *IEEE Sixth International Conference on Semantic Computing* 0 (2013), 274-277). Regarding ML-based solutions, other supervised or unsupervised methods for topic classification are also related, although not yet typically used for short messages but, rather, long documents. And regarding semantic-rule-based solutions, Annotated Query Language (AQL) rules combined with dictionaries are known approaches for topic classification with the usage of templates. Ontologies have also been applied for long documents.

With respect now to entity matching, in SMNs there are two problems one can find entity matching solutions for. One is, given a set containing user features on SMNs (like user information and activities), and another set containing real people information, the goal is to try to match the users within both sets. The second problem is, given two sets containing user features on two different SMNs, the goal is to try finding corresponding users, i.e., the biggest possible number of social profiles that refer to the same person between both social networks. The latter can also be called entity resolution (ER) problem, and in the past few years some work has been proposed to solve this problem. For instance, Peled, O., Fire, M., Rokach, L., and Elovici, Y., entity matching in online social networks, in *Social Computing (SocialCom)*, 2013 *International Conference on* (September 2013), pp. 339-344 proposed supervised learning techniques and extracted features to build different classifiers, which were then trained and used to rank the probability that two user profiles from two different online social networks (OSNs) belong to the same individual.

The former problem can be considered a subset of the latter if the fact that the second set contains real people information rather than SMN's profiles is ignored. And generally, as summarized by Raad, E., Chbeir, R., and Dipanda, A., User profile matching in social networks, in *Network-Based Information Systems (NBiS)*, 2010 *13th International Conference on* (September 2010), pp. 297-304, there are two approaches for handling this: (i) syntactic-based similarity approaches (providing exact or approximate lexicographical matching of two values); and (ii) semantic-based similarity approaches (used to measure how two values, lexicographically different, are semantically similar). For instance, Foaf-o-matic (http://www.foaf-o-matic.org/) and OKKAM (http://www.okkam.org/) projects aim at social profiles integration by means of formal FOAF (Friend-of-a-friend) semantics.

Regarding a syntactic-based similarity approach, summarized here are certain ones typically used for Uniform Resource Identified (URI), numeric-based attributes and, in the context of SNMs, two users' full names. Levenshtein or Edit Distance (see Levenshtein, V. Binary Codes Capable of Correcting Deletions, Insertions and Reversals. *Soviet Physics Doklady* 10 (1966), 707) is defined to be the smallest number of edit operations, inserts, deletes, and substitutions required to change one string into another. In addition, Jaro is an algorithm commonly used for name matching in data linkage systems. A similarity measure is calculated using the number of common characters (i.e., same characters that are within half the length of the longer string) and the number of transpositions. Winkler (or Jaro-Winkler) improves upon Jaro's algorithm by applying ideas based on empirical studies which found that fewer errors typically occur at the beginning of names (see Cohen, W. W., Ravikumar, P., and Fienberg, S. E. A comparison of string distance metrics for name-matching tasks, pp. 73-78; and Bilenko, M., Mooney, R., Cohen, W., Ravikumar, P., and Fienberg, S., Adaptive name matching in information integration, *IEEE Intelligent Systems* 18, 5 (September 2003), 16-23).

Another approach is the N-Gram name similarity, in which N-grams are sub-strings of length n and an n-gram similarity between two strings is calculated by counting the number of n-grams in common (i.e., n-grams contained in both strings) and dividing by either the number of n-grams in the shorter string (called Overlap coefficient), or the number of n-grams in the longer string (called Jaccard similarity), or the average number of n-grams in both strings. 2-grams and 3-grams have been used to calculate the similarity between the two users' full names. Finally, the Vector Name Matching (VMN) similarity approach proposed by Vosecky, J., Hong, D., and Shen, V., User identification across multiple social networks, in *Networked Digital Technologies, 2009. NDT '09. First International Conference on* (July 2009), pp. 360-365) was designed for full and partial matches of names consisting of one or more words. VMN supports the case of swapped names and the cases of partial matches.

SUMMARY

Various embodiments of the present disclosure provide for personalized offers based on two main components: (a) a hybrid method, combining rules and machine learning, to find users that post life events on one or more social media networks; and (b) an entity matching algorithm to find out possible relation between the detected social media users and people identified in a database distinct from the one or more social media networks (e.g., current clients of a corporation (or other entity) that desired to make the offers). In this regard it is assumed, for example, that if one can detect the life events of these users, then a personalized offer can be made to them even before they look for a product or service.

One example embodiment has been implemented on the IBM InfoSphere BigInsights platform to take advantage of the MapReduce programming framework for large scale data processing capability (and was tested on a dataset containing 9 million posts from TWITTER).

In one embodiment, a computer-implemented method for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the method comprising: obtaining, by a processor, the set of the plurality of social media messages; applying, by the processor, a rule-based search to the obtained set of the plurality of social media messages to generate a first subset of messages, wherein each message in the first subset of messages potentially contains one or more indicia of a life event; applying, by the processor, a machine learning method to further evaluate whether each of the messages in the first subset of messages actually relates to a life event and to generate a second subset of messages, wherein the second subset of messages contains fewer messages than the first subset of messages; performing, by the processor, a matching between at least one of the plurality of social media users associated with at least one message in the second subset of messages and at least one of the entities identified in the entity database in order to identify a matched entity; and outputting, by the processor, an indication of at least one matched entity.

In another embodiment, a computer readable storage medium, tangibly embodying a program of instructions executable by the computer for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the program of instructions, when executing, performing the following steps: obtaining the set of the plurality of social media messages; applying a rule-based search to the obtained set of the plurality of social media messages to generate a first subset of messages, wherein each message in the first subset of messages potentially contains one or more indicia of a life event; applying a machine learning method to further evaluate whether each of the messages in the first subset of messages actually relates to a life event and to generate a second subset of messages, wherein the second subset of messages contains fewer messages than the first subset of messages; performing a matching between at least one of the plurality of social media users associated with at least one message in the second subset of messages and at least one of the entities identified in the entity database in order to identify a matched entity; and outputting an indication of at least one matched entity.

In another embodiment, a computer-implemented system for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the system comprising: a processor; and a memory storing computer readable instructions that, when executed by the processor, implement: obtaining the set of the plurality of social media messages; applying a rule-based search to the obtained set of the plurality of social media messages to generate a first subset of messages, wherein each message in the first subset of messages potentially contains one or more indicia of a life event; applying a machine learning method to further evaluate whether each of the messages in the first subset of messages actually relates to a life event and to generate a second subset of messages, wherein the second subset of messages contains fewer messages than the first subset of messages; performing a matching between at least one of the plurality of social media users associated with at least one message in the second subset of messages and at least one of the entities identified in the entity database in order to identify a matched entity; and outputting an indication of at least one matched entity.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for segmenting social media users by means of life event detection on social media and entity matching. In another example, one or more methods may provide for segmenting social media users by means of life event detection on social media and entity matching. In another example, one or more algorithms may provide for may provide for segmenting social media users by means of life event detection on social media and entity matching.

Reference will now be made to details of a mechanism for life event detection and entity matching according to an embodiment.

Referring first to the hybrid life event detection mechanism according to this embodiment, it is noted that given a social media network, the life event detection mechanism has as a main goal to return a list of users that posted life events within a given time window. This task involves a crawler to gather data, and a mechanism to search for life events in the data. Note that not only accuracy is important in this case (to find the largest list of users with a high precision), but also performance is important since the mechanism is likely to face a large amount of data. In addition, in a production environment, the mechanism should allow for easy fine-tuning as well as addition and removal of life event classes (as disclosed herein).

Figure 1:
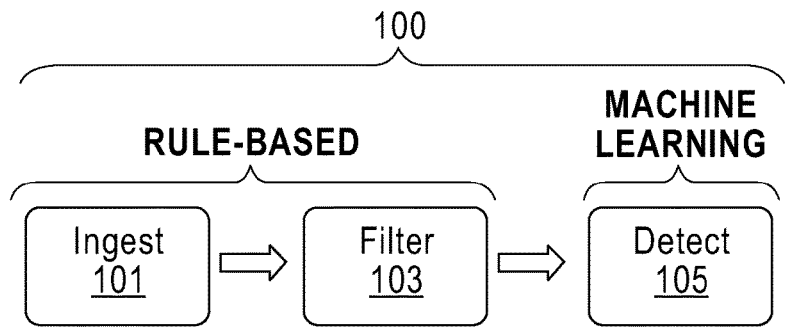
FIG. 1 depicts a diagram showing an example hybrid life event detection process according to an embodiment.

To cope with the aforementioned issues, a hybrid life event detection approach, combining both rules and machine learning (ML) is provided. Such a mechanism, depicted in FIG. 1 is basically composed of three phases or modules. More particularly, the process 100 includes a rule-based portion and a machine learning portion. The rule-based portion includes ingest 101 and filter 103. Further, the machine learning portion includes detect 105. The first phase, i.e., ingest, captures a database of posts to be used for the search for life events. This is done by considering a set of words that can possibly relate to all life events of the system. It is assumed that the larger this dataset, the larger the set of users that will be returned. Once the set of posts has been totally crawled, the filter module 103 selects the set of posts that is more likely to contain life events. That is, by considering a set of simple rules (but more elaborated rules than those of ingest) such as words and combinations of words (e.g., a set of rules for each type of life event), the posts that match these rules are marked with the corresponding possible life events.

Of note, however, despite the fact that these rules can indicate a possible life event, a portion (e.g., a large portion) of these messages can be false candidates. For this reason, the detect phase is then carried out to validate the possible life events with their corresponding probability. More particularly, for each post found in the filter phase, the mechanism applies the machine learning classifier of the corresponding possible life events and computes the probability that the post contains the given life event(s). With this information, all posts with life event probability above a threshold θ are selected and users of the corresponding posts are generated as the output (e.g., each user's name and/or contact information are output).

It is worth noting that currently machine learning is well-known to produce the best solutions to deal with ambiguous and noisy texts (such as microbloggings' posts). However, the hybrid solution disclosed herein takes advantage of the rule-based filtering to reduce the search space for the ML classifier, which can reduce both the number of errors and processing time. Moreover, by treating types of life events independently it makes it easy for fine-tuning, addition and removal of life event classes. For example, to add a new type of life event, one need only to append the corresponding keywords for the ingest phase, the rules for the filter phase, and a binary classifier in the detect phase. This can be done with no impact on the accuracy of existing life events.

With respect now to the entity matching of this embodiment, given the output of the life event detection mechanism, i.e. users (aka entities) that posted life events on social media, a main goal of the entity matching system is to find corresponding people in a database of real names. For achieving this task accurately, as much information as possible is used in order to decrease the level of uncertainty.

Dealing with users found on SMNs, though, is very challenging. First of all, on most SMNs the basic information about the user (e.g. name, location, age) is very limited (for example, on TWITTER only the name and location of the user are typically available). In addition, such personal information may be lacking or not relevant (since filling in such information may be not mandatory), and the content supplied by the users typically is not verified. Besides that, when the information is seriously provided by the user, other difficulty factors can appear, such as the use of simplified names (e.g., Claudio Pinhanez instead of Claudio Santos Pinhanez), the use of social media pen-names (e.g., @cinhanez instead of Claudio Santos Pinhanez), or the use of nicknames. To deal with some of the aforementioned difficulty factors, various mechanisms disclosed herein match names and locations of users using three different string distance functions.

One of these string distance functions that may be used is exact matching (EM): a match is found if all the names of an SMN user are identical to those of an entity in a database (e.g., an existing client of a company).

Another of these string distance functions that may be used is entity distance "1" (ED1): this is designed to consider misspellings and transpositions between adjacent characters as a match. For instance, the user "Jooa Paulo" matches the client "Joao Paulo", and the user "Carolina" matches "Craolina". In this case, the distance threshold $\sigma_1$ is used to define a match only if the similarity value is above this threshold.

Another of these string distance functions that may be used is entity distance "2" (ED2): this is designed to match abbreviations and some nicknames. For example, the user "Joseph S." matches the client "Joseph Salem"; the user "Fabinho" matches the client "Fábio", and "Mari" matches "Mariana". Similarly to ED1, the distance threshold $\sigma_2$ (e.g., related to strings length difference) is used to define a match.

The execution of three aforementioned matching algorithms results in three distinct sets of users, denoted $\Omega_{EM}$, $\Omega_{ED1}$ and $\Omega_{ED2}$. The resulting set of users $\Omega_{All}$ corresponds to the union of those individual sets. That is, $\Omega_{All} = \Omega_{EM} \cup \Omega_{ED1} \cup \Omega_{ED2}$.

It is worth mentioning that the Jaro Winkler similarity filtering (see Winkler, W. E. String comparator metrics and enhanced decision rules in the fellegi-sunter model of record linkage, in *Proceedings of the Section on Survey Research Methods* (*American Statistical Association*) (1990), pp. 354-359) is used in this embodiment prior to calling ED1 and ED2, to eliminate weak matches such as "Maria" and "Maria das Graças".

Furthermore, ED1 and ED2 may return more than one match for the same user, whenever the result is above the given threshold. In one example, only the matching with the highest value is considered.

As described herein is a mechanism for personalized offer based on life event detection. Once the mechanism detects users posting life events on a social media network, these users are matched against a database (e.g., an internal database of clients) to decide what is the best approach to offer them a service and/or product.

Figure 2:
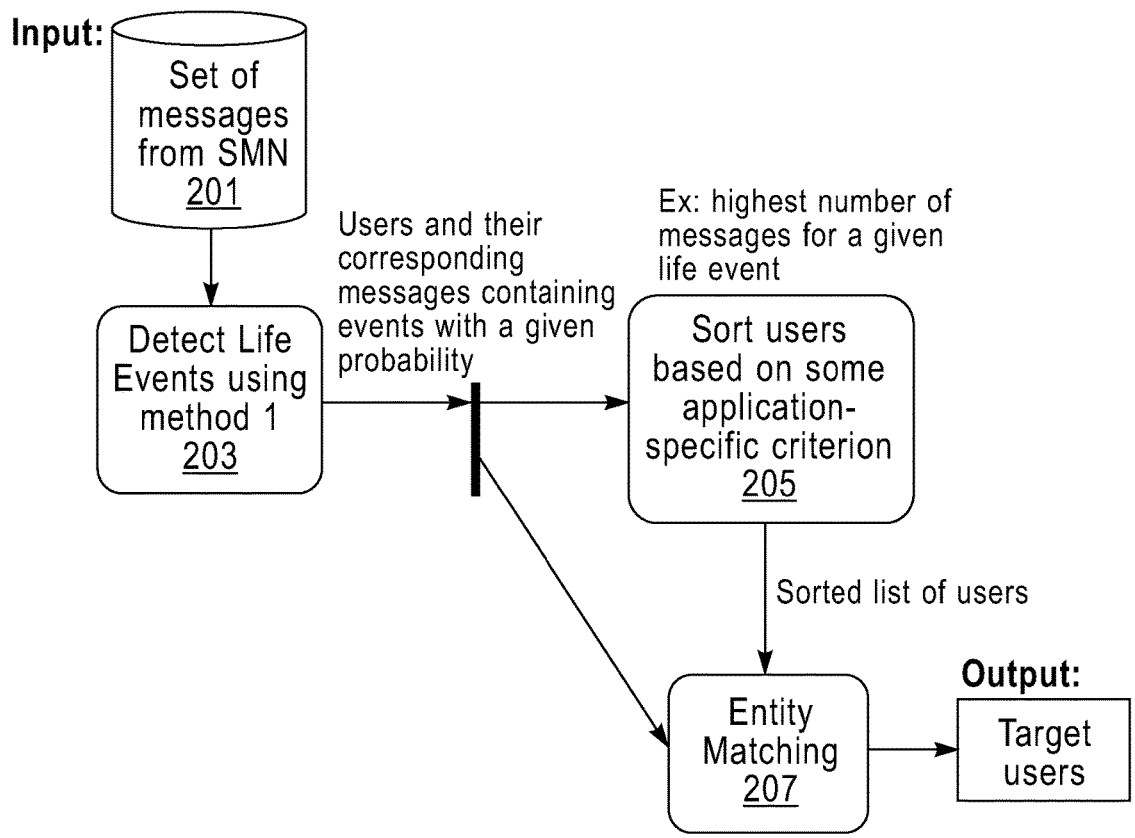
FIG. 2 depicts a diagram showing an example workflow according to an embodiment.

Reference will now be made to FIG. 2, showing an example workflow according to an embodiment. As seen in this FIG. 2, an input 201 may comprise a set of messages from one or more social media networks. Further, at step 203 (by using input 201) one or more life events are detected using, in this example, what is referred to as "method 1" (described in more detail below). Further, the output from step 203 comprises an indication of the users and their corresponding messages containing life events (with a given probability for each potential life event of actually being a life event). This output from step 203 may be sent directly to entity matching step 207 (which in turn outputs a list of target users). On the other hand, the output from step 203 may instead (or additionally) be sent to step 205, which sorts users based on some application specific criterion (e.g., highest number of messages for a give life event). In this case, as seen, the output from step 205 (that is, the sorted list of users) is sent to entity matching step 207 (which in turn outputs a list of target users).

Still referring to FIG. 2, in one specific example of the entity matching step 207 (which may utilize heuristics), the following may apply: (a) an exact match is found if each user name (token) is equal to a client name; and/or (b) a not exact match is found if at least one user name is matched with a client name using a string distance heuristic for each user name (in other examples, other similarity heuristics, not only using the user name, could be applied). In another example implementation of entity matching step 207, a Jaro Winkler similarity filter may be used. With respect to such a Jaro Winkler similarity filter, it is noted that: (a) it is designed and best suited for short strings such as person names; (b) it is used as a semantic filter (e.g., a user "Maria" and a client "Maria das Graças Silva" is theoretically a match, but a very weak one; a better result would be a match of first name and a match of at least one middle name or last name); and/or (c) a filter threshold of 0.95 (for example) may be used as a default and may eliminate most of the matches like the example above.

Figure 3:
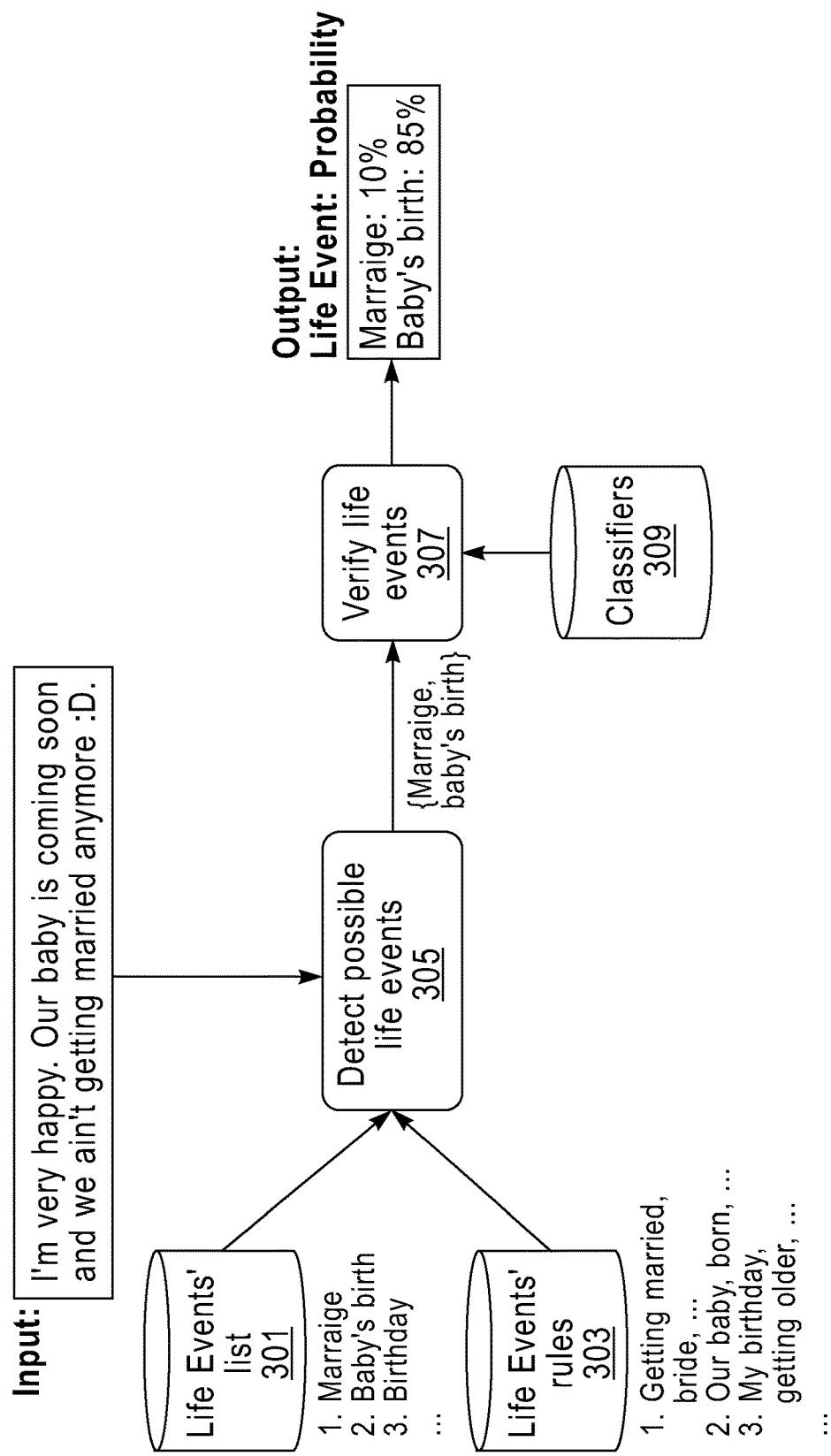
FIG. 3 depicts a diagram showing details of an example life event detection process according to an embodiment.

Referring now to FIG. 3, this FIG. 3 depicts a diagram showing details of an example life event detection "method 1" mentioned above. More particularly, it is seen that this life event detection "method 1" may operate by receiving at step 305 (detect possible life events) various inputs including: (a) a list of desired life events (classes), which is identified in this FIG. 3 as element 301; (b) a set of rules/keywords to detect posts that can possibly contain life events, one set for each class, which is identified in this FIG. 3 as element 303; and (c) one or more input messages (see the example text in FIG. 3 ("I'm very happy. Our baby is coming soon and we ain't getting married anymore :D"). Further, as seen, an output from step 305 (a list of possible life events) is sent to step 307 to verify life events. Also input to step 307 is an output from a trained classification method for each class, with the capability of verifying whether a text really contains or not a user's life events and computing the corresponding probability/confidence level. Finally, the output from step 307 is a list of life events and their probabilities (see the example provided, wherein there is a 10% probability of marriage and an 85% probability of baby's birth).

Figure 4:
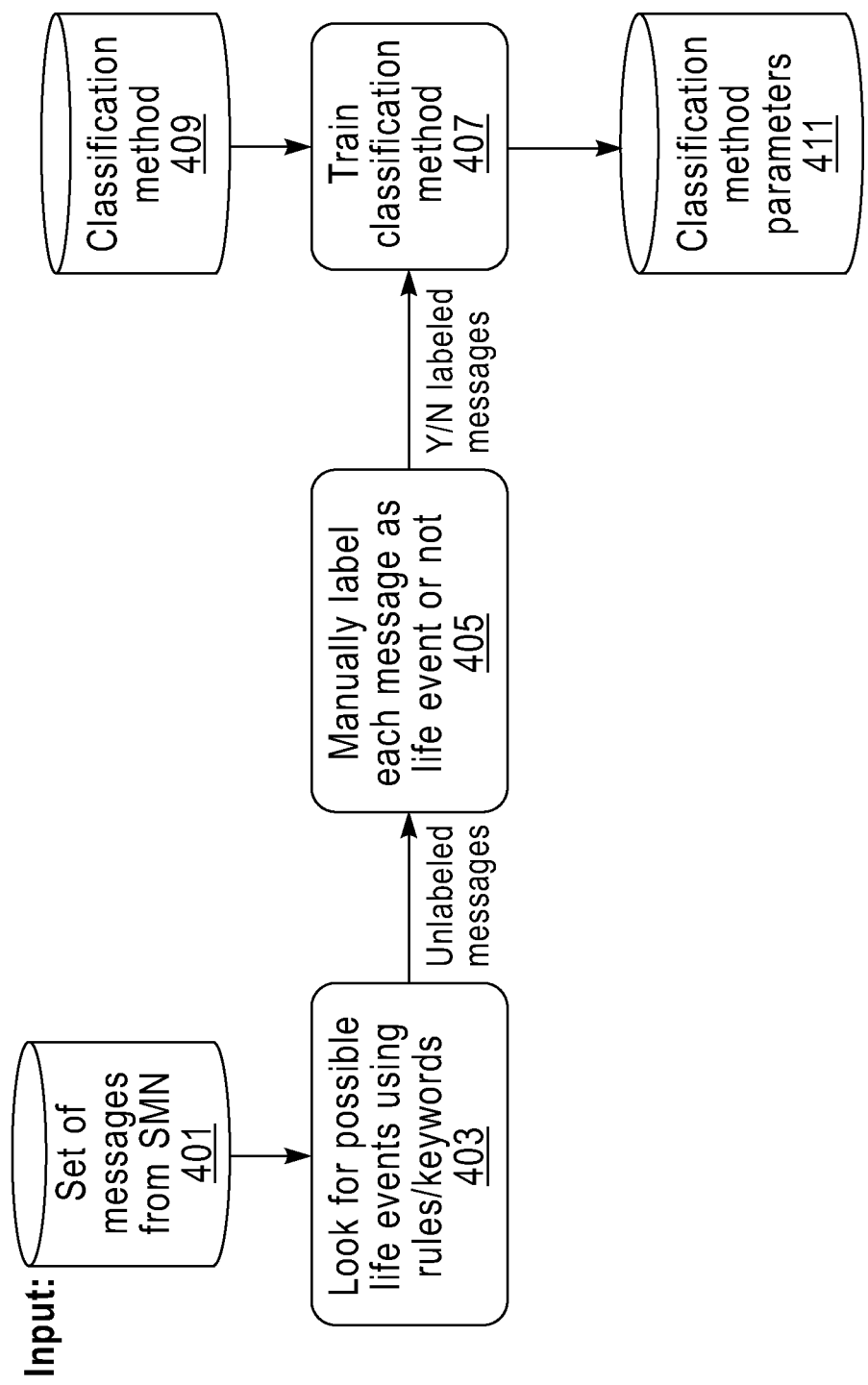
FIG. 4 depicts a diagram showing details of an example classifier training process (for each life event class) according to an embodiment.

Referring now to FIG. 4, this FIG. 4 shows an example classifier training process (for each life event class) according to an embodiment (this classifier training process may provide an output in the form of, for example, classifiers 309 of FIG. 3). More particularly, it is seen that this classifier training process may operate by receiving at step 403 input in the form of a set of messages from one or more social media networks. Step 403 looks for possible life events using rules/keywords. Step 403 outputs unlabeled messages to step 405 (which manually labels each message as a life event or not). The output from step 405 (in the form of each message being labeled with a yes or no (that is, being associated with a life event or not) is provided to step 407. Step 407 also receives input in the form of one or more classification methods to train (see element 409). The output from step 407 (which is a step of training classification method) is provided at classification method parameters (see element 411).

Figure 5:
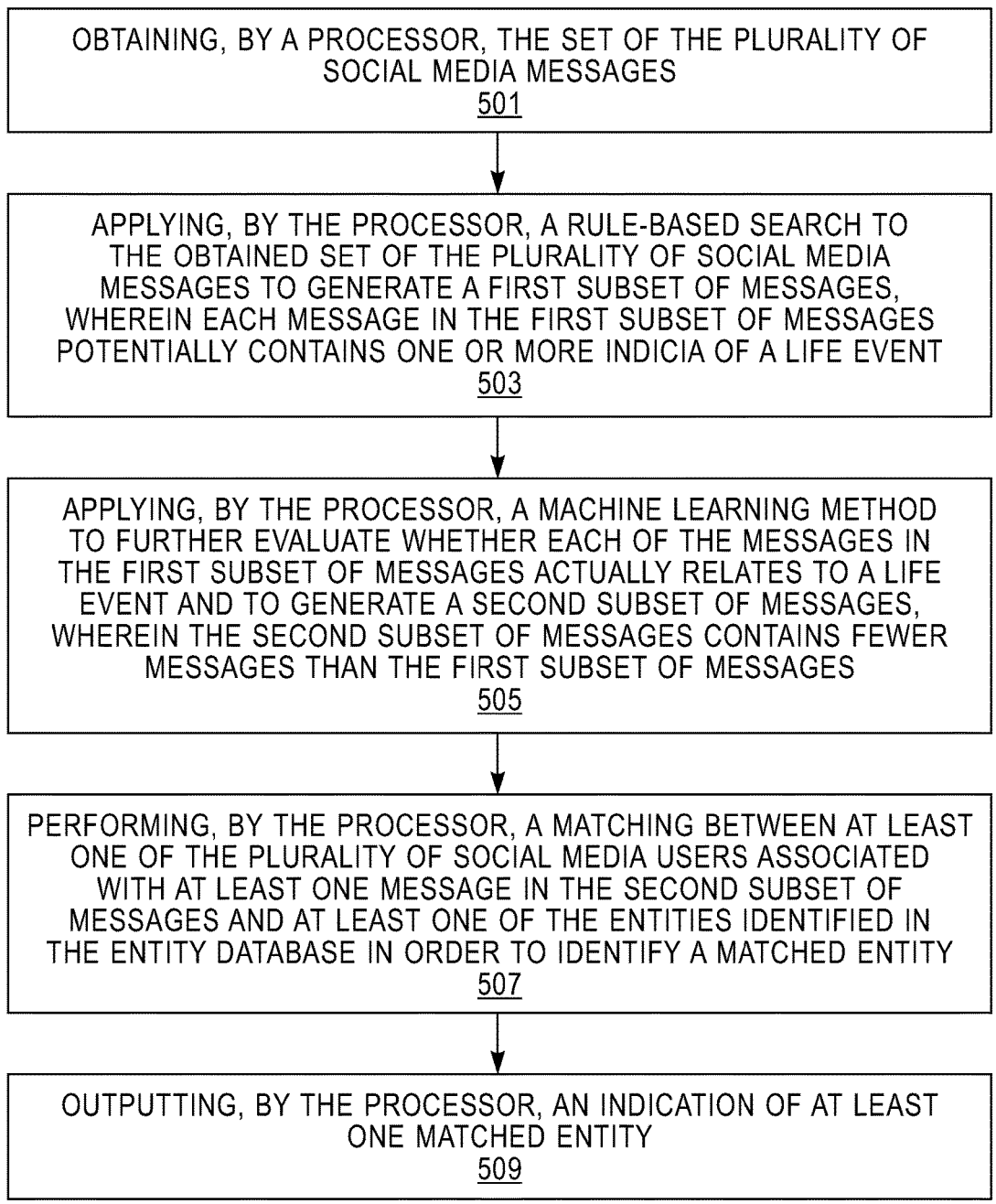
FIG. 5 depicts a flowchart of a method according to an embodiment.

Referring now to FIG. 5, a method for detecting life events associated with a plurality of social media users of a social media network based upon a set of a plurality of social media messages associated with the social media users and matching at least one of the social media users with at least one entity recorded in an entity database, wherein the entity database is distinct from the social media network and wherein the entity database contains identification of a plurality of entities is provided. As seen in this FIG. 5, the method of this embodiment comprises: at 501—obtaining, by a processor, the set of the plurality of social media messages; at 503—applying, by the processor, a rule-based search to the obtained set of the plurality of social media messages to generate a first subset of messages, wherein each message in the first subset of messages potentially contains one or more indicia of a life event; at 505—applying, by the processor, a machine learning method to further evaluate whether each of the messages in the first subset of messages actually relates to a life event and to generate a second subset of messages, wherein the second subset of messages contains fewer messages than the first subset of messages; at 507—performing, by the processor, a matching between at least one of the plurality of social media users associated with at least one message in the second subset of messages and at least one of the entities identified in the entity database in order to identify a matched entity; and at 509—outputting, by the processor, an indication of at least one matched entity.

Figure 6:
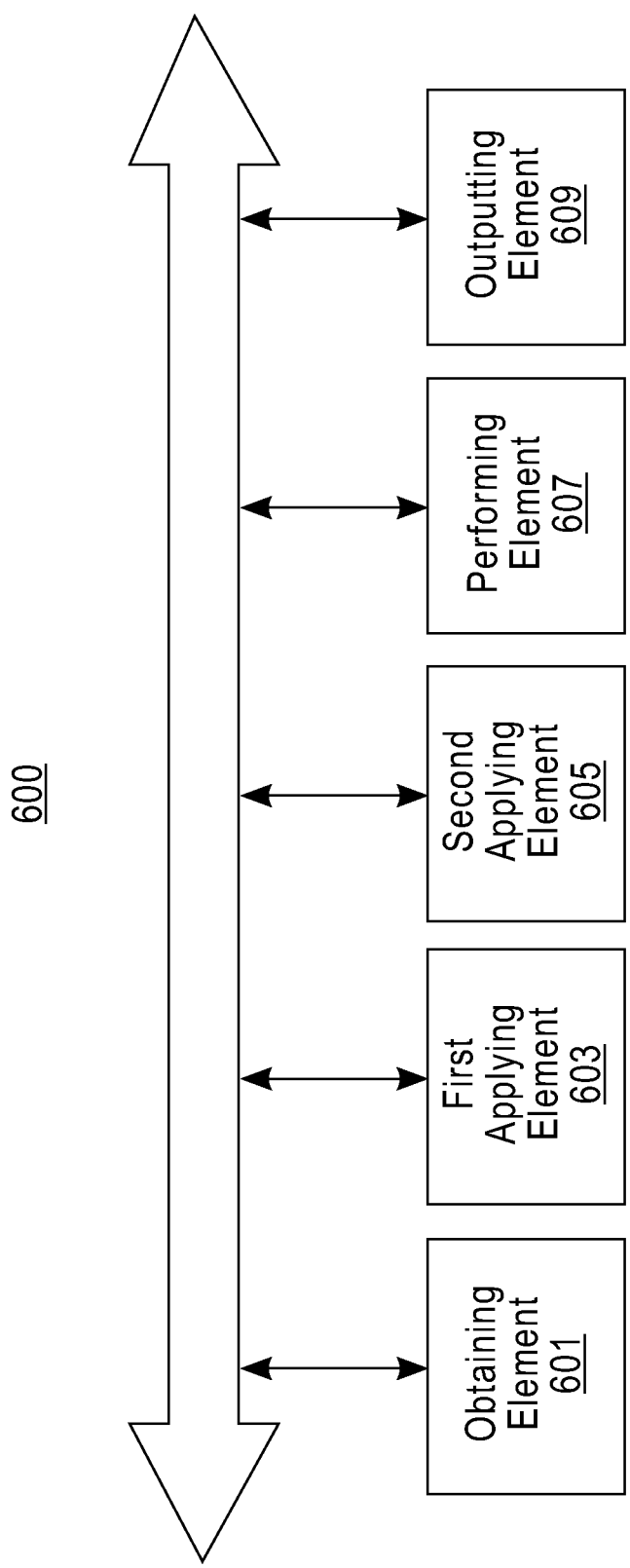
FIG. 6 depicts a block diagram of a system according to an embodiment.

Referring now to FIG. 6, in another embodiment, a system 600 for detecting life events associated with a plurality of social media users of a social media network based upon a set of a plurality of social media messages associated with the social media users and matching at least one of the social media users with at least one entity recorded in an entity database, wherein the entity database is distinct from the social media network and wherein the entity database contains identification of a plurality of entities is provided. This system may include a processor (not shown); and a memory (not shown) storing computer readable instructions that, when executed by the processor, implement: an obtaining element 601 configured to obtain the set of the plurality of social media messages; a first applying element 603 configured to apply a rule-based search to the obtained set of the plurality of social media messages to generate a first subset of messages, wherein each message in the first subset of messages potentially contains one or more indicia of a life event; a second applying element 605 configured to apply a machine learning method to further evaluate whether each of the messages in the first subset of messages actually relates to a life event and to generate a second subset of messages, wherein the second subset of messages contains fewer messages than the first subset of messages; a performing element 607 configured to perform a matching between at least one of the plurality of social media users associated with at least one message in the second subset of messages and at least one of the entities identified in the entity database in order to identify a matched entity; and an outputting element 609 configured to output an indication of at least one matched entity.

In one example, communication between and among the various components of FIG. 6 may be bi-directional. In another example, the communication may be carried out via the Internet, an intranet, a local area network, a wide area network and/or any other desired communication channel (s). In another example, each of the components may be operatively connected to each of the other components. In another example, some or all of these components may be implemented in a computer system of the type shown in FIG. 7.

Figure 7:
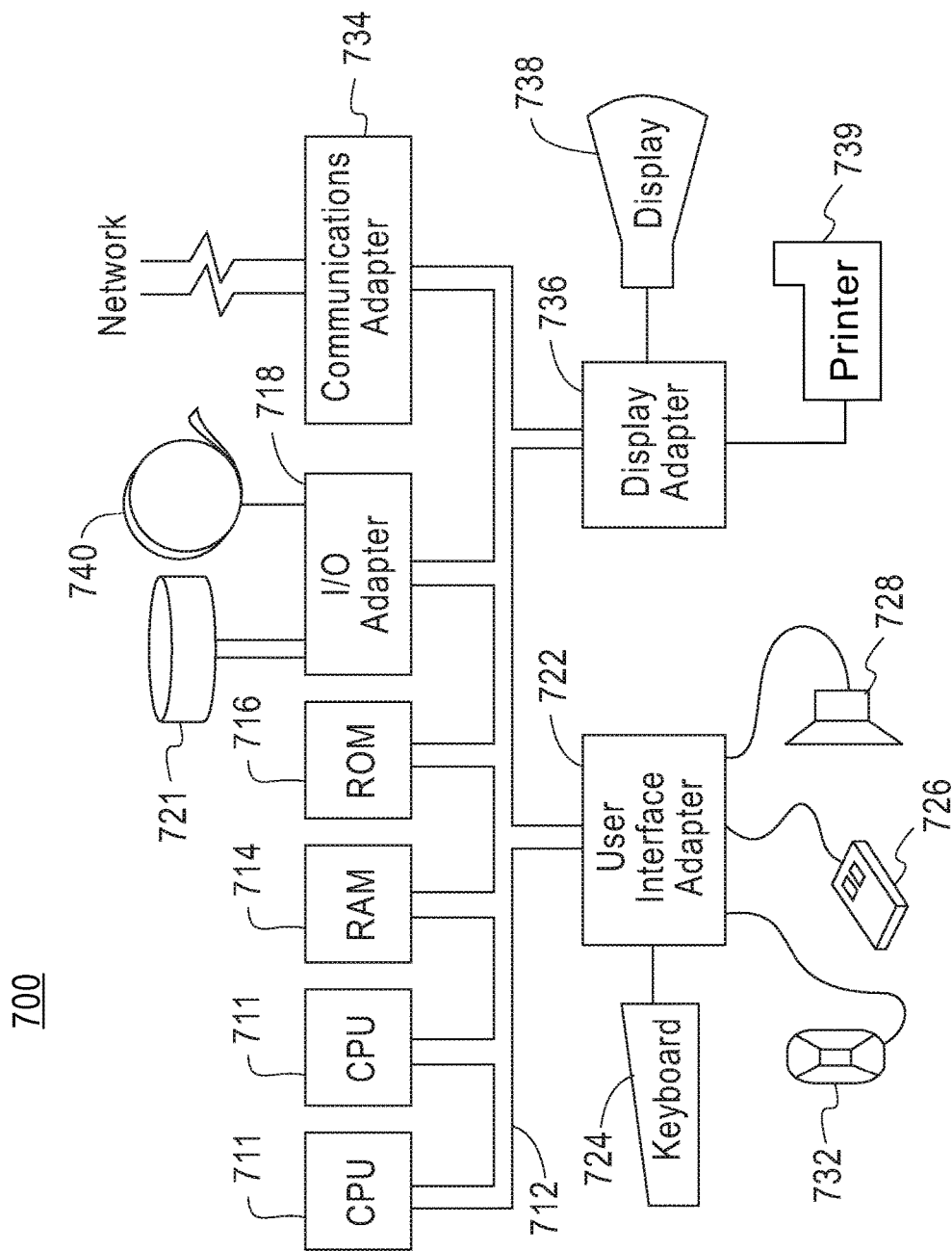
FIG. 7 depicts a block diagram of a system according to an embodiment.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

As described herein, a complete method/system to detect life events from large sets of messages posted on social media, to select appropriate users and to match them with an internal set of customer/clients is provided. In one example, a life event detection mechanism combines rules and machine learning-based algorithms that allows: (a) dealing with multiple life events at the same time; (b) incremental addition of new life events and/or incremental deletion of existing life events (since life events are decoupled); (c) higher confidence level and easier to fine-tune than rule-based systems; and/or (d) less development and running complexity than machine learning-only methods (e.g., the rule-based portion selects only the most probable candidates to be evaluated by the machine learning portion).

In one specific example, a life event detection mechanism may be provided to evaluate messages/posts from large sets of social media and to sort out those messages/posts in which a user mentions a life event (this may include a mechanism to detect a set of messages/posts that possibly contain life events, by means of rule-based search; and a machine learning mechanism to evaluate whether the detected messages/posts are actually a user's life event and the confidence level of which, so that only the messages/posts with the highest confidence levels are kept).

In addition, a user selection mechanism may: (a) sort the set of users found in accordance with their relevance (e.g., more relevant users first); and/or (b) provide entity matching to match the set of users found with another database of users (such as, for example, current customers).

As described herein, users on social media networks can post messages about events of their personal lives, namely life events. Identification of life events might be useful to better understanding the users (e.g., enhanced profiling). Further, users can be selected as target for marketing campaigns, for instance.

In this regard, given a large dataset of messages/posts produced by users on a social media network, a first goal is to find a list of users of interest (e.g., potential customers for a given product and/or service) based on the life events that are expressed by the users in a set of messages/posts, and a second goal is to match these users with a list of, for example, current customers.

Described herein are mechanisms for achieving the first goal above in view of certain social media-specific difficulty factors (including, for example: (a) ambiguous language (e.g., "I'm travelling to NYC tomorrow" vs "My mind is travelling the whole day."; (b) typing errors; (c) alternative typings (e.g., "2gether (together), 4u (for you), 2u (to you)); and/or (d) open and informal language that is prone to multiple events at a time (e.g., "Having a baby and buying a new house. Couldn't be happier!!").

Further, described herein are mechanisms for achieving the second goal above in view of the entity matching problem (given users posting life events on social media, to find the corresponding people in a database of real names). In various examples, the described mechanisms may deal with difficulties including: (a) use of simplified names; (b) use of social media pen-names (eg. @username); (c) use of nicknames; (d) social media robots; and/or (e) celebrities.

As described herein, various mechanisms overcome certain limitations of conventional systems by providing for a hybrid technique (e.g., combining a rule-based portion and a machine learning portion along with entity matching) for life event detection and entity matching (conventional systems are typically either rule-based (dictionary-based) or machine learning-based).

In this regard, a rules-only system might not be accurate enough (for example, a life event might be: "Omg I love that man we getting married" and a non life event might be: "married to the money . . . a #truelovestory"). Further, a rules-only system might be difficult to fine-tune (for example, a rule-based database does not scale in detecting life events as fast as a small labeled corpus database for using a machine learning based classifier). On the other hand, machine learning systems are typically more complex to develop and slower to run.

As described herein, in various examples two versions of edit distance are used (preceded by Jaro's similarity).

As described herein, various examples use machine learning to deal with multiple events at a time.

In one embodiment, a computer-implemented method for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the method comprising: obtaining, by a processor, the set of the plurality of social media messages; applying, by the processor, a rule-based search to the obtained set of the plurality of social media messages to generate a first subset of messages, wherein each message in the first subset of messages potentially contains one or more indicia of a life event; applying, by the processor, a machine learning method to further evaluate whether each of the messages in the first subset of messages actually relates to a life event and to generate a second subset of messages, wherein the second subset of messages contains fewer messages than the first subset of messages; performing, by the processor, a matching between at least one of the plurality of social media users associated with at least one message in the second subset of messages and at least one of the entities identified in the entity database in order to identify a matched entity; and outputting, by the processor, an indication of at least one matched entity.

In one example, the set of the plurality of social media messages had been sent by the social media users.

In another example, the entities are existing customers of a company that provides: (a) a product; (b) a service; or (c) a combination thereof.

In another example, the entities are potential customers of a company that provides: (a) a product; (b) a service; or (c) a combination thereof.

In another example, the machine learning further generates, for each of the messages in the second subset of messages, a confidence level indicative of a confidence that the respective message relates to a life event.

In another example, the method further comprises removing by the processor, from the second subset of messages, at least one message that has the lowest confidence level.

In another example, the method further comprises generating by the processor a third subset of messages, wherein the third subset of messages contains the messages from the second subset of messages having a confidence level that is above a threshold, and wherein the matching is performed using the third subset of messages rather than the second subset of messages.

In another example, the method further comprises contacting, by the processor, the matched entity, wherein the contact comprises a sales offer.

In another example, the contacting comprises contacting the matched entity electronically, via at least one of: (a) email; (b) short message service (SMS); (c) a social media message; or (d) any combination thereof.

In another example, the contacting comprises an offer for sale of at least one of: (a) a product; (b) a service; or (c) any combination thereof.

In another embodiment, a computer readable storage medium, tangibly embodying a program of instructions executable by the computer for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the program of instructions, when executing, performing the following steps: obtaining the set of the plurality of social media messages; applying a rule-based search to the obtained set of the plurality of social media messages to generate a first subset of messages, wherein each message in the first subset of messages potentially contains one or more indicia of a life event; applying a machine learning method to further evaluate whether each of the messages in the first subset of messages actually relates to a life event and to generate a second subset of messages, wherein the second subset of messages contains fewer messages than the first subset of messages; performing a matching between at least one of the plurality of social media users associated with at least one message in the second subset of messages and at least one of the entities identified in the entity database in order to identify a matched entity; and outputting an indication of at least one matched entity.

In one example, the machine learning further generates, for each of the messages in the second subset of messages, a confidence level indicative of a confidence that the respective message relates to a life event.

In another example, the program of instructions, when executing, further performs removing, from the second subset of messages, at least one message that has the lowest confidence level.

In another example, the program of instructions, when executing, further performs generating a third subset of messages, wherein the third subset of messages contains the messages from the second subset of messages having a confidence level that is above a threshold, and wherein the matching is performed using the third subset of messages rather than the second subset of messages.

In another example, the program of instructions, when executing, further performs contacting the matched entity electronically, and wherein the contact comprises a sales offer.

In another embodiment, a computer-implemented system for detecting life events associated with a plurality of social media users of a social media network based upon a set of a plurality of social media messages associated with the social media users and matching at least one of the social media users with at least one entity recorded in an entity database is provided, wherein the entity database is distinct from the social media network and wherein the entity database contains identification of a plurality of entities, the system comprising: a processor; and a memory storing computer readable instructions that, when executed by the processor, implement: obtaining the set of the plurality of social media messages; applying a rule-based search to the obtained set of the plurality of social media messages to generate a first subset of messages, wherein each message in the first subset of messages potentially contains one or more indicia of a life event; applying a machine learning method to further evaluate whether each of the messages in the first subset of messages actually relates to a life event and to generate a second subset of messages, wherein the second subset of messages contains fewer messages than the first subset of messages; performing a matching between at least one of the plurality of social media users associated with at least one message in the second subset of messages and at least one of the entities identified in the entity database in order to identify a matched entity; and outputting an indication of at least one matched entity.

In one example, the machine learning further generates, for each of the messages in the second subset of messages, a confidence level indicative of a confidence that the respective message relates to a life event.

In another example, the computer readable instructions, when executed by the processor, further implement removing, from the second subset of messages, at least one message that has the lowest confidence level.

In another example, the computer readable instructions, when executed by the processor, further implement generating a third subset of messages, wherein the third subset of messages contains the messages from the second subset of messages having a confidence level that is above a threshold, and wherein the matching is performed using the third subset of messages rather than the second subset of messages.

In another example, the computer readable instructions, when executed by the processor, further implement contacting the matched entity electronically, and wherein the contact comprises a sales offer.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for detecting life events associated with a plurality of social media users of a social media network based upon a set of a plurality of social media messages associated with the social media users, the computer-implemented method comprising:
   obtaining, by a processor, the set of the plurality of social media messages;
   applying, by the processor, a rule-based search to the obtained set of the plurality of social media messages to select a first subset of messages from the plurality of social media messages, wherein each message in the first subset of messages includes indications of at least one life event, and indications of life events are absent from the unselected messages among the plurality of social media messages;
   applying, by the processor, a machine learning method to the first subset of messages to determine a set of life event probabilities of each message among the first subset of messages, wherein each set of life event probabilities indicates one or more probabilities corresponding to one or more life events indicated by each message among the first subset of messages;
   comparing, by the processor, each life event probability of each message among the first subset of messages with a threshold;
   selecting, by the processor, a second subset of messages from the first subset of messages, wherein each message among the second subset of messages includes a life event corresponding to a life event probability greater than the threshold, and the unselected messages among the first subset of messages correspond to life event probabilities less than the threshold;
   identifying, by the processor, users of the second subset of messages;
   performing, by the processor, a matching between at least one of the identified users of the second subset of messages and at least one of the entities recorded in an entity database, wherein at least one of the identified users is associated with a corresponding compound user name comprising a first name and a last name, and wherein performing the matching includes:
      performing an exact matching procedure for defining an exact match between the first and last names of the respective identified user and the at least one entity, in response to all characters of both the first and last names of the respective identified user matching all characters of the at least one entity;
      performing an inexact matching procedure for:
         defining a first set of preliminary matches between the first name of the respective identified user and the at least one entity, in response to all characters of the first name matching all characters of the at least one entity, and at least one character of the last name not matching all characters of the at least one entity, and defining a second set of preliminary matches between the last name of the respective identified user and the at least one entity, in response to all characters of the last name matching all characters of the at least one entity, and at least one character of the first name not matching all characters of the at least one entity;

filtering the first and second sets of preliminary matches using similarity filtering to eliminate at least one weakest match from the first set of preliminary matches, the second set of preliminary matches, or both the first and second sets of preliminary matches;

using a string distance function comprising at least one of: (a) a first entity distance for treating one or more misspellings or one or more transpositions between adjacent characters of the corresponding compound user name of the respective social media user as defining a match between the user and the at least one entity, (b) a second entity distance for considering abbreviations and nicknames of the corresponding compound user name as defining a match between the user and the at least one entity, wherein the entity database is distinct from the social media network and wherein the entity database contains identification of a plurality of entities;

outputting, by the processor, an indication of at least one matched entity comprising a potential customer for a product or a service based upon the indications of the at least one life event for the at least one matched entity;

comparing, by the processor, the at least one matched entity with a list of current customers to identify at least one matched entity who is a current customer; and generating, by the processor, a customized offer of the product or the service to the current customer.

2. The computer-implemented method of claim 1, wherein the set of the plurality of social media messages had been sent by the social media users.

3. The computer-implemented method of claim 1, wherein the customized offer comprises contacting the matched entity electronically, via at least one of: (a) email; (b) short message service (SMS); (c) a social media message; or (d) any combination thereof.

4. The computer-implemented method of claim 3, wherein the customized offer comprises an offer for sale of a combination of the good and the service.

5. The computer-implemented method of claim 1, wherein a particular message among the first subset of messages includes an indication of a particular life event, and the computer-implemented method further comprising:

determining a life event probability for the particular life event, wherein the life event probability indicates a confidence level that the particular message is associated with the particular life event;

comparing the particular life event probability with the threshold;

determining that the particular life event probability is greater than the threshold; and selecting the particular message from the first subset of messages.

6. The computer-implemented method of claim 5, further comprising associating the particular message with the particular life event.

7. The computer-implemented method of claim 5, wherein when the first life event probability is greater than the threshold, and the second life event probability is less than the threshold, the computer-implemented method further comprising associating the particular message with the first life event.

8. The computer-implemented method of claim 1, wherein a particular message among the first subset of messages includes indications of a first life event and a second life event, and the computer-implemented method further comprising:

determining a first life event probability for the first life event, wherein the first life event probability indicates a first confidence level that the particular message is associated with the first life event;

determining a second life event probability for the second life event, wherein the second life event probability indicates a second confidence level that the particular message is associated with the second life event;

comparing the first life event probability with the threshold;

comparing the second life event probability with the threshold;

determining that at least one of the first life event probability and the second life event probability is greater than the threshold; and selecting the particular message from the first subset of messages.

9. A computer readable storage medium, tangibly embodying a program of instructions executable by the computer for detecting life events associated with a plurality of social media users of a social media network based upon a set of a plurality of social media messages associated with the social media users, the program of instructions, when executing, performing the following steps:

obtaining the set of the plurality of social media messages;

applying a rule-based search to the obtained set of the plurality of social media messages to select a first subset of messages from the plurality of social media messages, wherein each message in the first subset of messages includes indications of at least one life event, and indications of life events are absent from the unselected messages among the plurality of social media messages;

applying a machine learning method to the first subset of messages to determine a set of life event probabilities of each message among the first subset of messages, wherein each set of life event probabilities indicates one or more probabilities corresponding to one or more life events indicated by each message among the first subset of messages;

comparing each life event probability of each message among the first subset of messages with a threshold;

selecting a second subset of messages from the first subset of messages, wherein each message among the second subset of messages includes a life event corresponding to a life event probability greater than the threshold, and the unselected messages among the first subset of messages correspond to life event probabilities less than the threshold;

identifying users of the second subset of messages;

performing a matching between at least one of the identified users of the second subset of messages and at least one of the entities recorded in an entity database, wherein at least one of the identified users is associated with a corresponding compound user name comprising a first name and a last name, and wherein performing the matching includes:

performing an exact matching procedure for defining an exact match between the first and last names of the respective identified user and the at least one entity, in response to all characters of both the first and last names of the respective identified user matching all characters of the at least one entity;

performing an inexact matching procedure for:
 defining a first set of preliminary matches between the first name of the respective identified user and the at least one entity, in response to all characters of the first name matching all characters of the at least one entity, and at least one character of the last name not matching all characters of the at least one entity, and
 defining a second set of preliminary matches between the last name of the respective identified user and the at least one entity, in response to all characters of the last name matching all characters of the at least one entity, and at least one character of the first name not matching all characters of the at least one entity;

filtering the first and second sets of preliminary matches using similarity filtering to eliminate at least one weakest match from the first set of preliminary matches, the second set of preliminary matches, or both the first and second sets of preliminary matches;

using a string distance function comprising at least one of: (a) a first entity distance for treating one or more misspellings or one or more transpositions between adjacent characters of the corresponding compound user name of the respective social media user as defining a match between the user and the at least one entity, (b) a second entity distance for considering abbreviations and nicknames of the corresponding compound user name as defining a match between the user and the at least one entity, wherein the entity database is distinct from the social media network and wherein the entity database contains identification of a plurality of entities;

outputting an indication of at least one matched entity comprising a potential customer for a product or a service based upon the indications of the at least one life event for the at least one matched entity;

comparing the at least one matched entity with a list of current customers to identify at least one matched entity who is a current customer; and generating a customized offer of the product or the service to the current customer.

10. The computer readable storage medium of claim 9, wherein the program of instructions, when executing, further performs contacting the matched entity electronically with the customized offer via at least one of: (a) email; (b) short message service (SMS); (c) a social media message; or (d) any combination thereof.

11. The computer readable storage medium of claim 9, wherein a particular message among the first subset of messages includes an indication of a particular life event, and the program of instructions, when executing, further performs:
 determining a life event probability for the particular life event, wherein the life event probability indicates a confidence level that the particular message is associated with the particular life event;
 comparing the particular life event probability with the threshold;
 determining that the particular life event probability is greater than the threshold; and
 selecting the particular message from the first subset of messages.

12. The computer readable storage medium of claim 11, wherein the program of instructions, when executing, further performs associating the particular message with the particular life event.

13. The computer readable storage medium of claim 9, wherein a particular message among the first subset of messages includes indications of a first life event and a second life event, and the program of instructions, when executing, further performs:
 determining a first life event probability for the first life event, wherein the first life event probability indicates a first confidence level that the particular message is associated with the first life event;
 determining a second life event probability for the second life event, wherein the second life event probability indicates a second confidence level that the particular message is associated with the second life event;
 comparing the first life event probability with the threshold;
 comparing the second life event probability with the threshold;
 determining that at least one of the first life event probability and the second life event probability is greater than the threshold; and
 selecting the particular message from the first subset of messages.

14. The computer readable storage medium of claim 13, wherein when the first life event probability is greater than the threshold, and the second life event probability is less than the threshold, the program of instructions, when executing, further performs associating the particular message with the first life event.

15. A computer-implemented system for detecting life events associated with a plurality of social media users of a social media network based upon a set of a plurality of social media messages associated with the social media users, the computer-implemented system comprising:
 a processor; and
 a memory storing computer readable instructions that, when executed by the processor, implement:
 obtaining the set of the plurality of social media messages;
 applying a rule-based search to the obtained set of the plurality of social media messages to select a first subset of messages from the plurality of social media messages, wherein each message in the first subset of messages includes indications of at least one life event, and indications of life events are absent from the unselected messages among the plurality of social media messages;
 applying a machine learning method to the first subset of messages to determine a set of life event probabilities of each message among the first subset of messages, wherein each set of life event probabilities indicates one or more probabilities corresponding to one or more life events indicated by each message among the first subset of messages;
 comparing each life event probability of each message among the first subset of messages with a threshold;
 selecting a second subset of messages from the first subset of messages, wherein each message among the second subset of messages includes a life event corresponding to a life event probability greater than the threshold, and the unselected messages among the first subset of messages correspond to life event probabilities less than the threshold;

identifying users of the second subset of messages;

performing a matching between at least one of the identified users of the second subset of messages and at least one of the entities recorded in an entity database, wherein at least one of the identified users is associated with a corresponding compound user name comprising a first name and a last name, and wherein performing the matching includes:

performing an exact matching procedure for defining an exact match between the first and last names of the respective identified user and the at least one entity, in response to all characters of both the first and last names of the respective identified user matching all characters of the at least one entity;

performing an inexact matching procedure for:

defining a first set of preliminary matches between the first name of the respective identified user and the at least one entity, in response to all characters of the first name matching all characters of the at least one entity, and at least one character of the last name not matching all characters of the at least one entity, and defining a second set of preliminary matches between the last name of the respective identified user and the at least one entity, in response to all characters of the last name matching all characters of the at least one entity, and at least one character of the first name not matching all characters of the at least one entity;

filtering the first and second sets of preliminary matches using similarity filtering to eliminate at least one weakest match from the first set of preliminary matches, the second set of preliminary matches, or both the first and second sets of preliminary matches;

using a string distance function comprising at least one of: (a) a first entity distance for treating one or more misspellings or one or more transpositions between adjacent characters of the corresponding compound user name of the respective social media user as defining a match between the user and the at least one entity, (b) a second entity distance for considering abbreviations and nicknames of the corresponding compound user name as defining a match between the user and the at least one entity, wherein the entity database is distinct from the social media network and wherein the entity database contains identification of a plurality of entities;

outputting an indication of at least one matched entity comprising a potential customer for a product or a service based upon the indications of the at least one life event for the at least one matched entity;

comparing the at least one matched entity with a list of current customers to identify at least one matched entity who is a current customer; and generating a customized offer of the product or the service to the current customer.

16. The computer-implemented system of claim 15, wherein the computer readable instructions, when executed by the processor, further implement contacting the matched entity electronically with the customized offer via at least one of: (a) email; (b) short message service (SMS); (c) a social media message; or (d) any combination thereof.

17. The computer-implemented system of claim 15, wherein a particular message among the first subset of messages includes an indication of a particular life event, and the computer readable instructions, when executed by the processor, further implement:

determining a life event probability for the particular life event, wherein the life event probability indicates a confidence level that the particular message is associated with the particular life event;

comparing the particular life event probability with the threshold;

determining that the particular life event probability is greater than the threshold; and selecting the particular message from the first subset of messages.

18. The computer-implemented system of claim 17, wherein the computer readable instructions, when executed by the processor, further implement associating the particular message with the particular life event.

19. The computer-implemented system of claim 15, wherein a particular message among the first subset of messages includes indications of a first life event and a second life event, and the computer readable instructions, when executed by the processor, further implement:

determining a first life event probability for the first life event, wherein the first life event probability indicates a first confidence level that the particular message is associated with the first life event;

determining a second life event probability for the second life event, wherein the second life event probability indicates a second confidence level that the particular message is associated with the second life event;

comparing the first life event probability with the threshold;

comparing the second life event probability with the threshold;

determining that at least one of the first life event probability and the second life event probability is greater than the threshold; and selecting the particular message from the first subset of messages.

20. The computer-implemented system of claim 19, wherein when the first life event probability is greater than the threshold, and the second life event probability is less than the threshold, the computer readable instructions, when executed by the processor, further implement associating the particular message with the first life event.

* * * * *